United States Patent
Fadul et al.

(10) Patent No.: US 11,863,924 B2
(45) Date of Patent: Jan. 2, 2024

(54) VEHICLE MOUNTED CAGE TOWER SPEAKER

(71) Applicant: Grace Digital, Inc., San Diego, CA (US)

(72) Inventors: Greg William Fadul, San Diego, CA (US); James D. Palmer, San Diego, CA (US)

(73) Assignee: Grace Digital, Inc., San Diego, CA (US)

( * ) Notice: Subject to any disclaimer, the term of this patent is extended or adjusted under 35 U.S.C. 154(b) by 0 days.

(21) Appl. No.: 17/829,299

(22) Filed: May 31, 2022

(65) Prior Publication Data

US 2023/0388683 A1    Nov. 30, 2023

(51) Int. Cl.
| | |
|---|---|
| H04R 1/02 | (2006.01) |
| G06F 3/16 | (2006.01) |
| H04R 1/24 | (2006.01) |
| H04R 3/00 | (2006.01) |
| F21V 33/00 | (2006.01) |
| F21Y 115/10 | (2016.01) |

(52) U.S. Cl.
CPC .......... *H04R 1/025* (2013.01); *F21V 33/0056* (2013.01); *G06F 3/165* (2013.01); *H04R 1/023* (2013.01); *H04R 1/026* (2013.01); *H04R 1/24* (2013.01); *H04R 3/00* (2013.01); F21Y 2115/10 (2016.08); H04R 2201/028 (2013.01); H04R 2420/07 (2013.01); H04R 2499/13 (2013.01)

(58) Field of Classification Search
CPC ........ H04R 1/025; H04R 1/023; H04R 1/026; H04R 1/24; H04R 3/00; H04R 2201/028; H04R 2420/07; H04R 2499/13; F21V 33/0056; F21Y 2115/10; G06F 3/165
See application file for complete search history.

(56) References Cited

U.S. PATENT DOCUMENTS

| | | | |
|---|---|---|---|
| 7,755,975 B2 | 7/2010 | Pettersen et al. | |
| 9,883,265 B2 | 1/2018 | Cheney et al. | |
| 10,887,125 B2 | 1/2021 | Rexach et al. | |
| 2007/0117535 A1* | 5/2007 | Yu | H04B 1/207 455/344 |
| 2015/0036858 A1* | 2/2015 | Aboabdo | H04R 1/02 381/334 |
| 2016/0084454 A1 | 3/2016 | Svitak et al. | |
| 2016/0198247 A1* | 7/2016 | Cheney | H04R 31/006 381/334 |
| 2019/0215971 A1 | 7/2019 | Merenda | |
| 2022/0070560 A1 | 3/2022 | Lorenzen | |

\* cited by examiner

*Primary Examiner* — Andrew L Sniezek
(74) *Attorney, Agent, or Firm* — Kerr IP Group, LLC

(57) ABSTRACT

A cage tower speaker system for outdoor vehicles and watercraft is disclosed. The cage tower speaker system includes a driver cage tower speaker and a dummy cage tower speaker. The driver cage tower speaker includes an outer housing, an amplifier, a speaker assembly, a removable rechargeable battery, and a mounting bracket. The outer housing includes a frontal opening, a rear opening, a rear wall, an exterior surface, and a plurality of membranes. The outer housing, the frontal opening, and the rear wall form an interior sound space surrounding the speaker assembly. The exterior surface extends from the frontal opening to the rear opening and surrounds the interior sound space. Each of the plurality of membranes are coupled to the exterior surface and the interior sound space.

19 Claims, 9 Drawing Sheets

VEHICLE MOUNTED CAGE TOWER SPEAKER

FIELD

The present disclosure relates to cage tower speaker systems and methods of operating such. More particularly, the present disclosure relates to a cage tower speaker adapted for outdoor use and mounting on a vehicle.

BACKGROUND

A variety of systems for housing, amplifying, mounting, and protecting one or more speakers have been developed. Initially, these systems were designed specifically for indoor use and maximizing the user's experience in a home setting. In particular, the cabinets or other structures containing speakers were composed of wood and/or cardboard and organized to emit and disperse sound to reflect off of nearby walls and ceilings back toward a listener. The advent of speaker systems constructed from plastic and/or metal facilitated portable systems suitable for certain outdoor uses.

Many consumers wish to utilize audio or other multimedia devices while engaging in recreational activities such as power sports, boating, off-roading, etc. Indeed, portable wireless speakers are increasingly used in varied indoor and outdoor environments including boating, off-road driving, and other rugged and potentially weather and water prone environments. Available media players typically draw power from a vehicle battery, requiring conscientious management of battery loading and charge.

However, successfully adapting speaker systems for attachment to various recreational land vehicles, particularly off-road vehicles such as an ATV, dune buggies and similar land vehicles, as well as marine vessels such as ski boats, off-shore recreational fishing boats, party barges and similar watercraft, requires overcoming various problems unique to these land vehicles and watercraft. Sound systems for such vehicles must (1) be impact resistant; (2) provide durable attachment to the vehicle; (3) this durable attachment must also be versatile to allow for quick and simple adjustments to the position and/or directionality of the speakers to accommodate changes in the listening environment; (4) provide sufficient audio volume without significantly impacting a vehicle operator's visibility; and (5) protect the electrical components of the speakers from dirt, dust, mud, and/or water.

U.S. Pat. No. 5,191,177 was an early attempt to provide a stable, convenient speaker system for an automobile requiring minimal alteration to the vehicle. This speaker system's convenience relied on the presence of a flat surface within the vehicle for the system to rest upon. Since this system merely rested upon a flat surface within the vehicle, it was limited to on-road trucks and cars, but not suitable to off-road vehicles or watercraft that travel over bumpy terrain such as dusty/muddy trails and choppy water. Such off-road and over-water travel submit sound systems to vigorous physical shaking and jolting requiring very secure attachment to the vehicle or watercraft, as well as construction that could withstand significant mechanical impact. Additionally, this speaker system was constructed from cardboard, further limiting its use to an enclosed interior location of a vehicle as it would not withstand prolonged or repeated exposure to dirt, dust, mud, rain, and/or splashed water, such as from waves, wakes or wet passengers.

U.S. Patent Publication 2008/0141924 presented an alternative speaker assembly especially adapted for use on watercraft. This system solved the problem of water exposure and impact durability by mounting speakers within retractable housings. However, these housings require substantial modification of the watercraft and provide only directional sound aimed rearward toward individuals towed behind the watercraft.

U.S. Patent No. 8,948,437 improved upon the speaker systems for watercraft by providing vertically oriented sound rods of a stainless steel construction that provide 360° sound in an approximately horizontal plane. However, the mounting system employed is limited to watercraft, and particularly watercraft with existing fishing rod holders that can receive the mounting pole of the sound rod.

U.S. Patent No. 9,469,254 provided a more versatile mounted speaker system for off-road vehicles, ATVs, UTVs, watercraft, and motorcycles that employs an L-shaped mounting bracket to attach an array of speakers to such vehicles. The L-shaped mounting bracket enables rotation of the speaker array 360° about the plane in which the array is mounted. However, the orientation of the speaker array limits sound dispersion from any given orientation (i.e., rotational position) of the array to a single direction.

Although such prior art devices have addressed some of the prior art problems, there remains a need in the industry for an easily and durably mounted speaker system that provides directional adjustable sound that operates in the dusty, dirty, muddy, and wet conditions encountered by off-road vehicles and watercraft that better reduces or eliminates prior art problems.

SUMMARY

A cage tower speaker system is described herein. In one embodiment, the cage tower speaker system includes a cage tower speaker having an outer housing, an amplifier, a speaker assembly, a removable rechargeable battery, and a mounting bracket. The outer housing includes a frontal opening, a rear opening, a rear wall, an exterior surface, and a plurality of membranes. The outer housing, the frontal opening, and the rear wall form an interior sound space surrounding the speaker assembly. The exterior surface extends from the frontal opening to the rear opening and surrounds the interior sound space. Each of the plurality of membranes are coupled to the exterior surface and the interior sound space.

In another embodiment, the cage tower speaker system includes a driver cage tower speaker and a dummy cage tower speaker. In this embodiment, the driver cage tower speaker includes an outer housing, an amplifier, a speaker assembly, a removable rechargeable battery, and a mounting bracket. The outer housing includes a frontal opening, a rear opening, a rear wall, and an exterior surface. The outer housing, the frontal opening, and the rear wall form an interior sound space surrounding the speaker assembly. The exterior surface extends from the frontal opening to the rear opening and surrounds the interior sound space. The dummy cage tower speaker includes its own outer housing, speaker assembly, and mounting bracket. The dummy speaker outer housing includes a frontal opening, a rear wall, and an exterior surface, that together form an interior sound space within the dummy speaker. The driver speaker delivers power and audio input to the dummy speaker to provide audio output from both the driver speaker and the dummy speaker.

FIGURES

The present invention will be more fully understood by reference to the following drawings which are presented for illustrative, not limiting, purposes.

DESCRIPTION

Persons of ordinary skill in the art will realize that the following description is illustrative and not in any way limiting. Other embodiments of the claimed subject matter will readily suggest themselves to such skilled persons having the benefit of this disclosure. It shall be appreciated by those of ordinary skill in the art that the apparatus and methods described herein may vary as to configuration and as to details. The following detailed description of the illustrative embodiments includes reference to the accompanying drawings, which form a part of this application. The drawings show, by way of illustration, specific embodiments in which the invention may be practiced. It is to be understood that other embodiments may be utilized, and structural changes may be made without departing from the scope of the claims.

In various embodiments, the cage tower speaker system disclosed herein may include one or more cage tower speaker unit. In embodiments where the cage tower speaker system comprises multiple speaker units, one of the cage tower speaker units may be a driving speaker unit that includes a battery and amplifier, while the other cage tower speaker units are dummy speakers that lack their own battery, an amplifier, or a combination thereof. In these embodiments, the driving speaker unit provides both power and audio input to the dummy speaker unit(s).

In various embodiments, one or more cage tower speaker unit may include a removeable rechargeable battery within an outer cage tower speaker housing. The outer housing of each cage tower speaker can further include waterproof membranes coupled to the outer housing that serve the dual purpose of releasing a portion of the back pressure generated by the cage tower speaker, as well as, equalizing the internal pressure of the outer housing with the external pressure of the ambient air surrounding the outer housing, while sealing the interior spaces of the outer housing from the outdoor conditions in which the cage tower speaker system operates.

In operation, the waterproof membranes on the outer housing further maintain the structural integrity of the cage tower speaker, its components, and the sound quality emitted therefrom by preventing pressure differentials accumulating between the interior of the cage tower speaker and the exterior of the cage tower speaker due to environmental conditions or back pressures emitted from the cage tower speaker.

Figure 1:
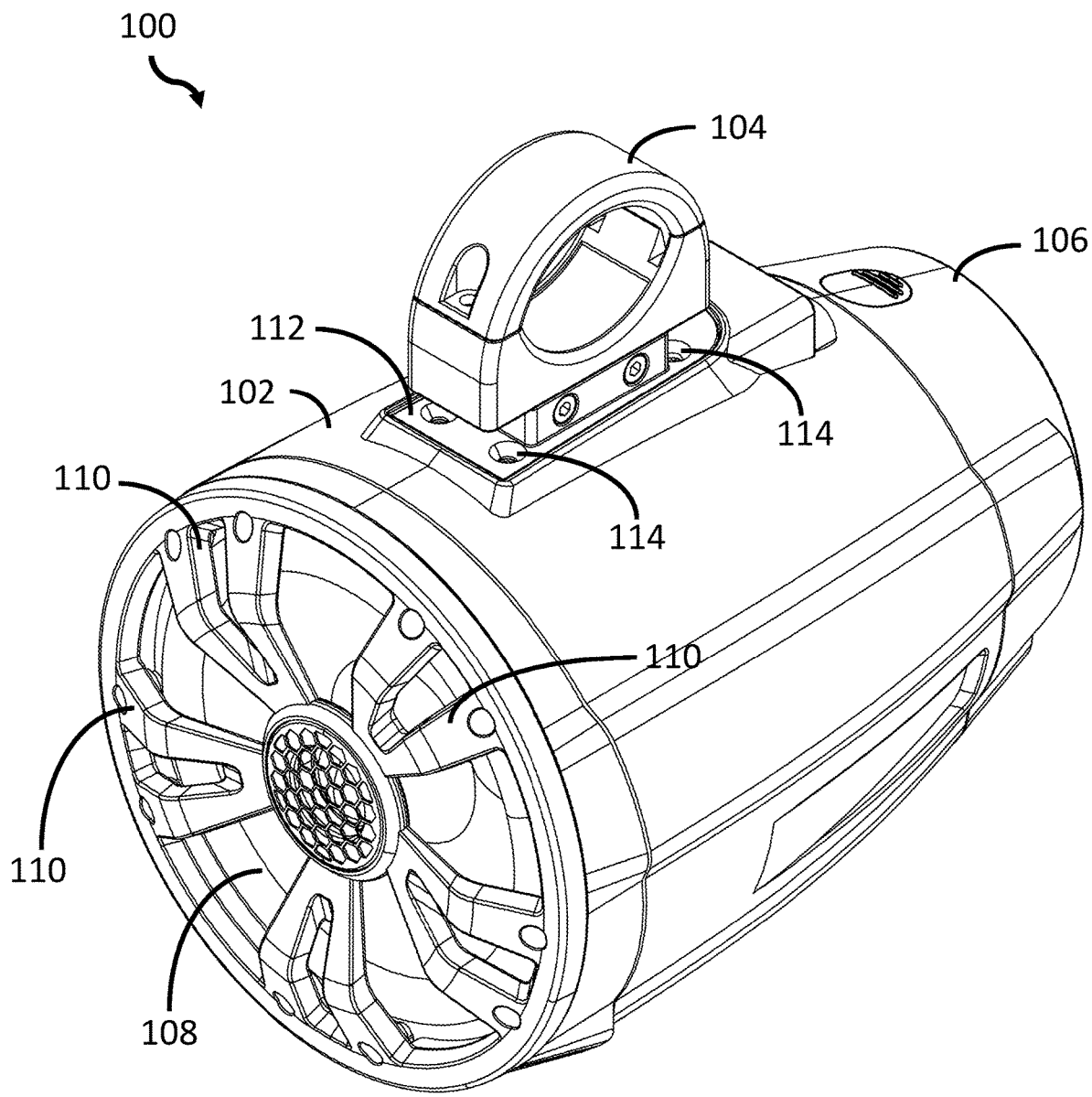
FIG. 1 shows an isometric view of an illustrative cage tower speaker.

Referring to FIG. 1, there is shown an isometric view of an illustrative cage tower speaker 100. The illustrative cage tower speaker includes an outer housing 102, a mounting bracket 104, a rear cover 106, a speaker driver assembly 108, and a speaker grill 110. The outer housing 102 is hollow and forms an interior cavity space (not shown) that receives the speaker driver assembly 108. The interior cavity space extends from a frontal opening (not shown) that receives the speaker driver assembly 108 to an internal barrier wall (not shown). The outer housing 102 includes an exterior surface that extends from the speaker grill 110 to the rear cover 106. The outer housing 102 also includes a mounting inlay 112 on the exterior surface that receives the mounting bracket 104.

The speaker grill 110 covers the speaker driver assembly 108 and is coupled to the outer housing 102. In some embodiments, the speaker grill 110 is coupled to the outer housing 102 with threading on the speaker grill 110 that is complimentary to threading on one of the frontal opening (not shown) and the exterior surface of the outer housing 102. In some embodiments, the speaker grill 110 is coupled to the outer housing 102 with one or more fasteners, such as screws, nails, pins, snaps, or rivets.

In some embodiments, the outer housing 102 is of a durable waterproof construction, such as metal, plastic, or another equivalently rigid material.

Although the illustrative speaker grill 110 is a combination of a traditional metal mesh and ribbed frame, the speaker grill 110 may be composed of any suitable material, such as plastic, carbon fiber, and a combination thereof. In some embodiments, the mesh portion of the speaker grill 110 may be formed from any suitable patterning other than the simple repeating array of offset circular holes, such as slots, asymmetric patterning, or patterning resembling images. In some embodiments, the speaker grill 110 comprises only a ribbed frame. In some embodiments, the speaker grill 110 comprises only a mesh spanning the entirety of the frontal opening (not shown) and/or speaker driver assembly 108. In some embodiments, the speaker grill 110 comprises only a grill mesh.

In some embodiments, the speaker driver assembly 108 includes a clear plastic speaker driver cone and an LED light that is behind the driver cone and within the outer housing 102 interior cavity space. The clear plastic speaker driver cone transmits light from the LED outward away from the cage tower speaker 100. In these embodiments, the speaker driver assembly 108, the speaker driver cone, the outer housing 102, the speaker grill, and any combination thereof form a waterproof to protect the speaker components from water damage.

The illustrative rear cover 106 is of a durable waterproof construction, such as metal, plastic, or another equivalently rigid material. In some embodiments, the rear cover 106 encloses a rear cavity (not shown) that receives one or more batteries (not shown). In some embodiments, the rear cover 106 is removably affixed to the outer housing 102 by means of one or more screws, pins, fasteners, or threading on the rear cover 106 that mates with threading on the rear of the outer housing 102. In the embodiment where the rear cover 106 is removably affixed to the outer housing 102 by threading, the rear cover threading intermeshes with threading surrounding the rear cavity (shown in FIG. 8) of the outer housing 102.

In some embodiments, the mounting inlay 112 includes a plurality of receiver holes 114 that couple with fasteners that affix the mounting bracket 104 to the outer housing 102. In some embodiments, the mounting inlay 112 is formed from metal, a metal alloy, a composite, a plastic, or other suitably durable material that is capable of supporting the weight of the cage tower speaker 100. In some embodiments, the mounting inlay 112 may be affixed to the outer housing 102 with adhesive, waterproof foam, and/or internal fasteners such as screws, rivets, or pins. The combination of adhesive, waterproof foam, and internal fasteners seal the joint between the outer housing 102 and the mounting inlay 112.

In some embodiments, the receiver holes 114 include collars that couple with pins, flanged or otherwise. In some embodiments, the receiver holes 114 include internal threading that intermesh with screws, threaded bolts, or other fasteners. In some embodiments, the threaded bolts pass through unthreaded clearance holes in the mounting bracket 104 and extend into the female threaded receiver holes 114 of the mounting inlay 112 to immovably affix the mounting bracket 104 to the outer housing 102. In some embodiments, the plurality of receiver holes 114 are arranged in rows, circles, and other geometric patterns that allow the mounting bracket 104 to be attached in multiple locations along the length of the mounting bracket 104 and multiple orientations along that length, such as rotated at a right angle or any other angle to the length of the outer housing 102. In the illustrative embodiment, the mounting bracket 104 is affixed to the outer housing at the center position of the mounting inlay 112 and oriented parallel to the length of the outer housing 102.

In the illustrative embodiment, the mounting inlay 112 is located on a top portion of the outer housing 102. In some embodiments, the mounting inlay 112 is located on a side portion of the outer housing 102.

The illustrative mounting bracket 104 is a two-piece ring bracket that can be attached to a pipe, pole, or other cylindrical structure. In some embodiments, the mounting bracket 104 is an L-shaped bracket having attachment points located on one arm of the L-bracket that enables the arm to be removably connected to the mounting inlay 112 and the outer housing 102. In some embodiments, the L-shaped bracket further includes attachment points located on a second arm of the L-bracket that enables the second arm to be removably connected to a vehicle. In some embodiments, the L-shaped bracket further includes a pivot point located on the other arm of the L-shaped bracket and provides an attachment point to a vehicle or mating bracket thereon. The combination of the L-shape and the pivot point allows a cage tower speaker 100 attached thereto to rotate about the pivot point 360°. The pivot point can receive a bolt, pin, or other rotatable fastener that extends through the pivot point and the mating bracket to allow the cage tower speaker 100 to rotate about the pivot point. In some embodiments, the mounting bracket 104 is an angle bracket.

In various embodiments, the speaker driver assembly 108 includes a woofer speaker. In various embodiments, the speaker driver assembly 108 includes a mid-range speaker. In various embodiments, the speaker driver assembly 108 is a tweeter speaker.

In some embodiments, the cage tower speaker 100 includes an integrated amplifier housed with the outer housing 102 of the cage tower speaker 100. In these embodiments, the amplifier is electrically coupled to the removable rechargeable battery 128 (shown in FIGS. 7 and 8).

Figure 2:
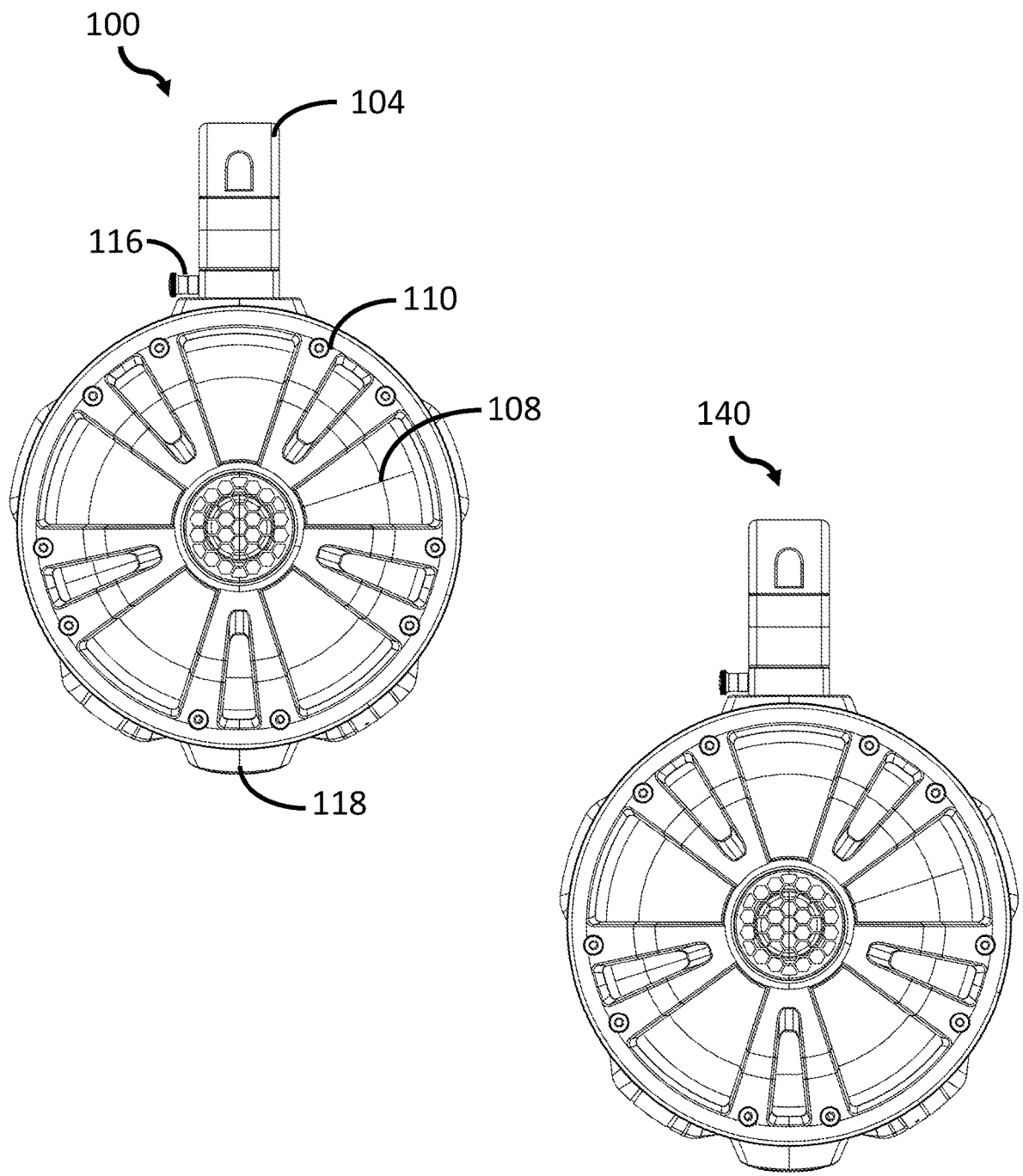
FIG. 2 shows a front view of the illustrative cage tower speaker and a second dummy cage tower speaker.

Referring now to FIG. 2 there is shown a front view of the cage tower speaker 100. This view shows the mounting bracket 104 end on, which includes a set screw 116. The set screw 116 may be loosened to quickly change the orientation of the mounting bracket 104 by allowing the outer housing 102 (and by extension the cage tower speaker itself) to rotate. The set screw 116 may then be tightened to secure the outer housing 102 in a new orientation.

This view also shows a control panel 118 end on, which includes a plurality of radios. In some embodiments, the plurality of radios includes an FM radio. In some embodiments, the plurality of radios includes a Bluetooth radio. In some embodiments, the plurality of radios includes a Wi-Fi radio. In some embodiments, the control panel 118 includes an FM radio module. In some embodiments, the control panel 118 includes a Bluetooth module. In some embodiments, the control panel 118 includes one or more buttons 119 (shown in FIG. 6) that may receive user input, i.e., be depressed by a user, and thereby operate or engage the various functions and capabilities of the cage tower speaker 100 and any associated dummy speaker 140. In some embodiments, the one or more buttons of the control panel 118 receive user input in order to control operation of the cage tower speaker 100, such as Bluetooth connectivity, speaker volume, sound balance, music controls, and lighting effects.

In some embodiments, the control panel 118 includes indicator lights 122 (shown in FIG. 6) that identify operation modes and functions of the cage tower speaker 100, i.e., whether the cage tower speaker 100 is receiving power, whether the battery has a charge, power on/off, receiving radio signal, receiving Wi-Fi signal, receiving Bluetooth signal, or playing music. The control panel 118 is communicatively coupled to the speaker driver assembly 108, as well as a power source, such as a battery or power from the vehicle to which it is mounted, a processor, a memory, a wireless communication module, auxiliary ports, and one or more LED lights embedded in the speaker driver assembly 108. Power from an external power source may be received through a power cable and delivered to the control panel 118, processor, memory, wireless communication module, LED lights, and speaker driver assembly(s) 118. As with the other electrically powered components of the cage tower speaker 100, the LED light(s) is electrically coupled to, controlled by, and operated from the control panel 118.

Figure 3:
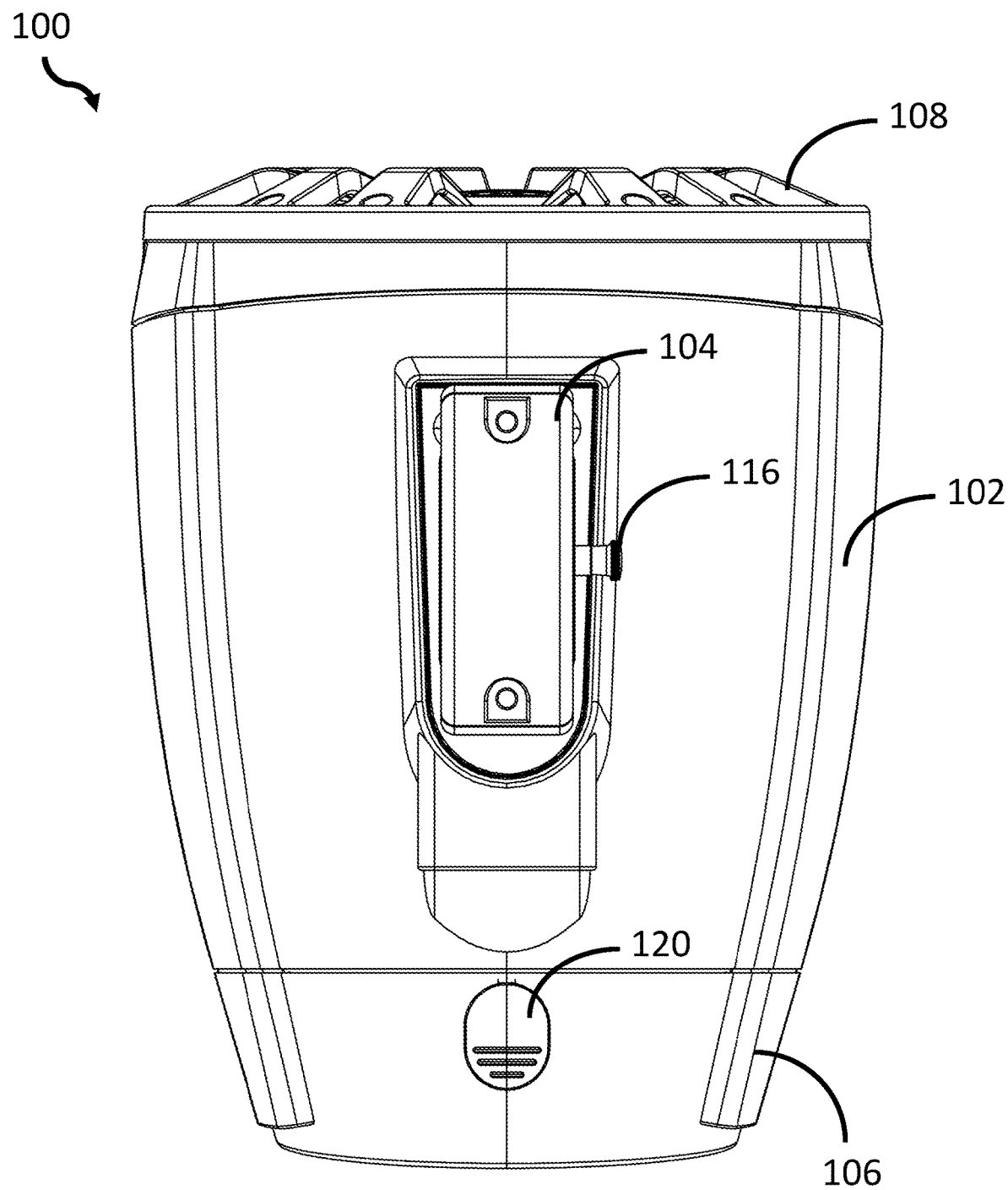
FIG. 3 shows a top view of the illustrative cage tower speaker.

Referring now to FIG. 3 there is shown a top view of the illustrative cage tower speaker 100. This view shows the mounting bracket 104 aligned with the length of the outer housing 102 and locked in place by the set screw 116. This view also shows the speaker grill 108 in profile and depressor button 120 that detaches the rear cover 106 from the outer housing 102. The depressor button 120 may activate or disengage a clasp holding the rear cover 106 in place and affixed to the outer housing 102.

Figure 4:
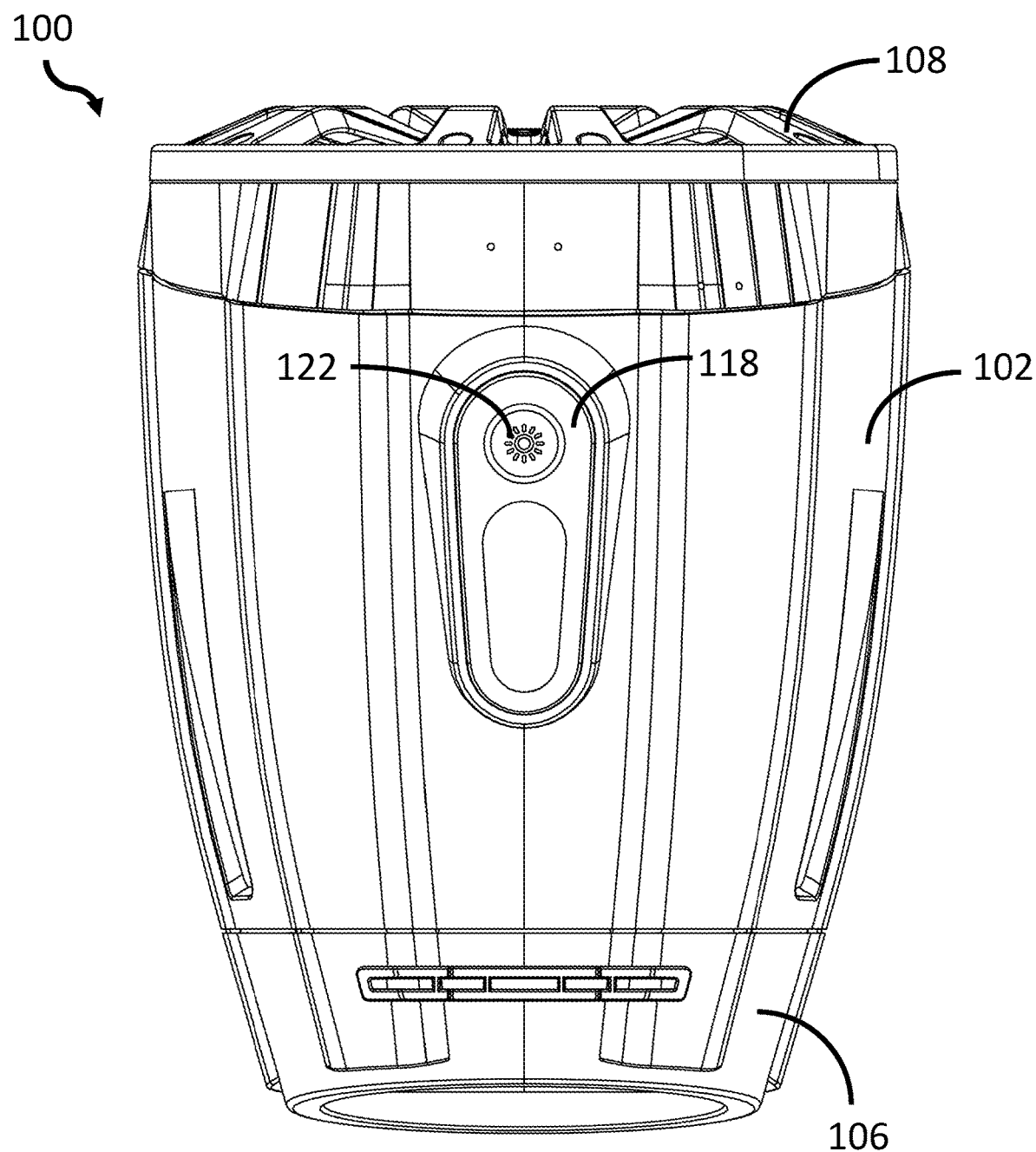
FIG. 4 shows a bottom view of the illustrative cage tower speaker.

Referring now to FIG. 4 there is shown a bottom view of the illustrative cage tower speaker 100. This view again displays the speaker grill 108 in profile, while also displaying the rear cover 106 in profile. This view further displays the control panel 118 and an indicator light 122 on the control panel 118. In some embodiments, the indicator light 122 may indicate that the cage tower speaker 100 is receiving power, such as from an outdoor vehicle, watercraft, or similar vehicle. In some embodiments, the indicator light 122 may indicate that the cage tower speaker 100 is communicatively coupled to a dummy cage tower speaker, such as by Bluetooth. In some embodiments, the indicator light 122 may indicate that the cage tower speaker 100 is communicatively coupled to a user device, i.e., smartphone. In some embodiments, the indicator light 122 may indicate that the cage tower speaker 100 is communicatively coupled to a user device, such as by Bluetooth.

Figure 5:
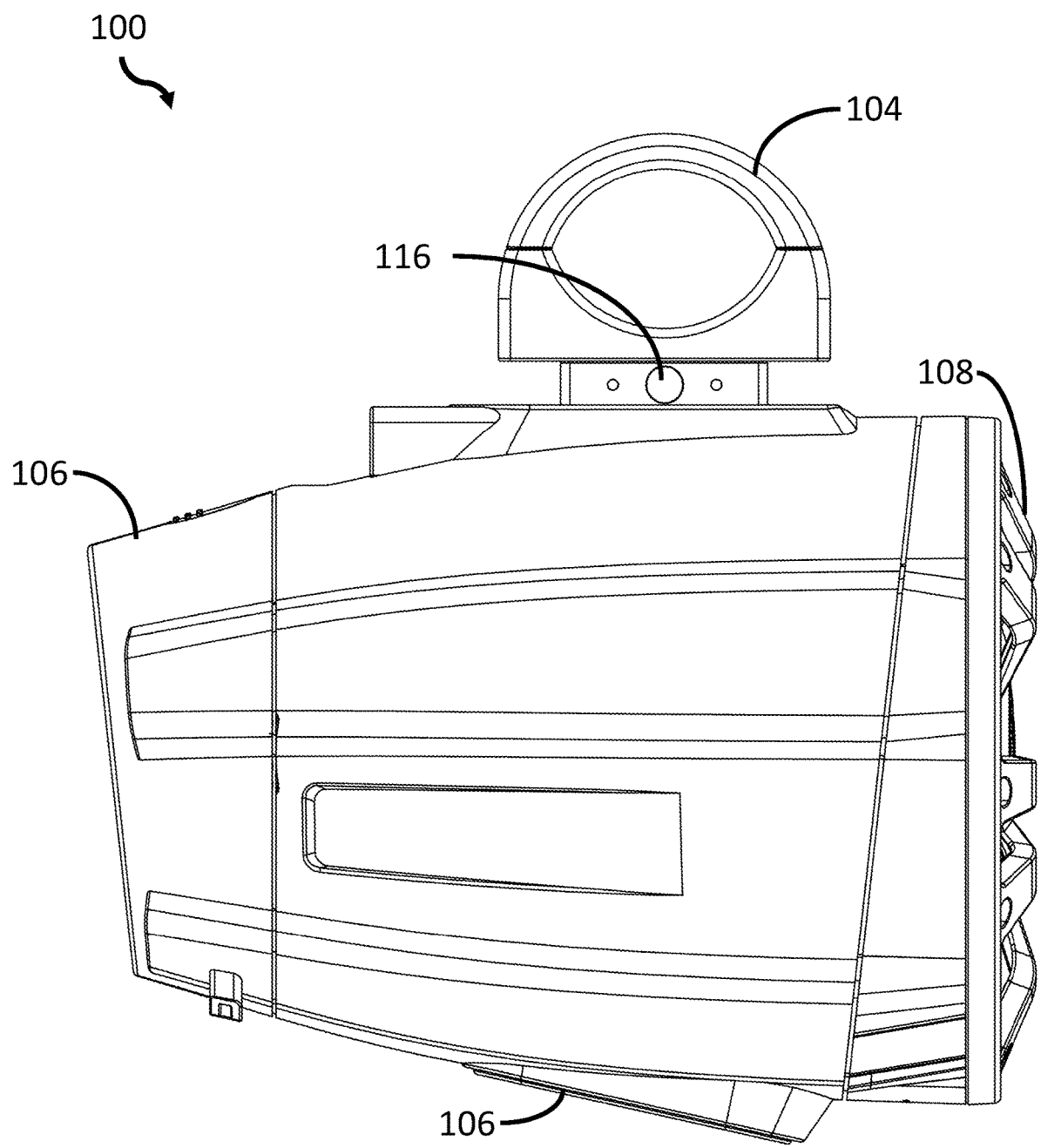
FIG. 5 shows a side view of the illustrative cage tower speaker.

Referring now to FIG. 5 there is shown a side view of the cage tower speaker 100. This side view displays the illustrative two-piece ring mounting bracket 104 secured in a lengthwise orientation by the set screw 116. This side view also displays the speaker grill 108, the rear cover 106, and the control panel in profile.

Figure 6:
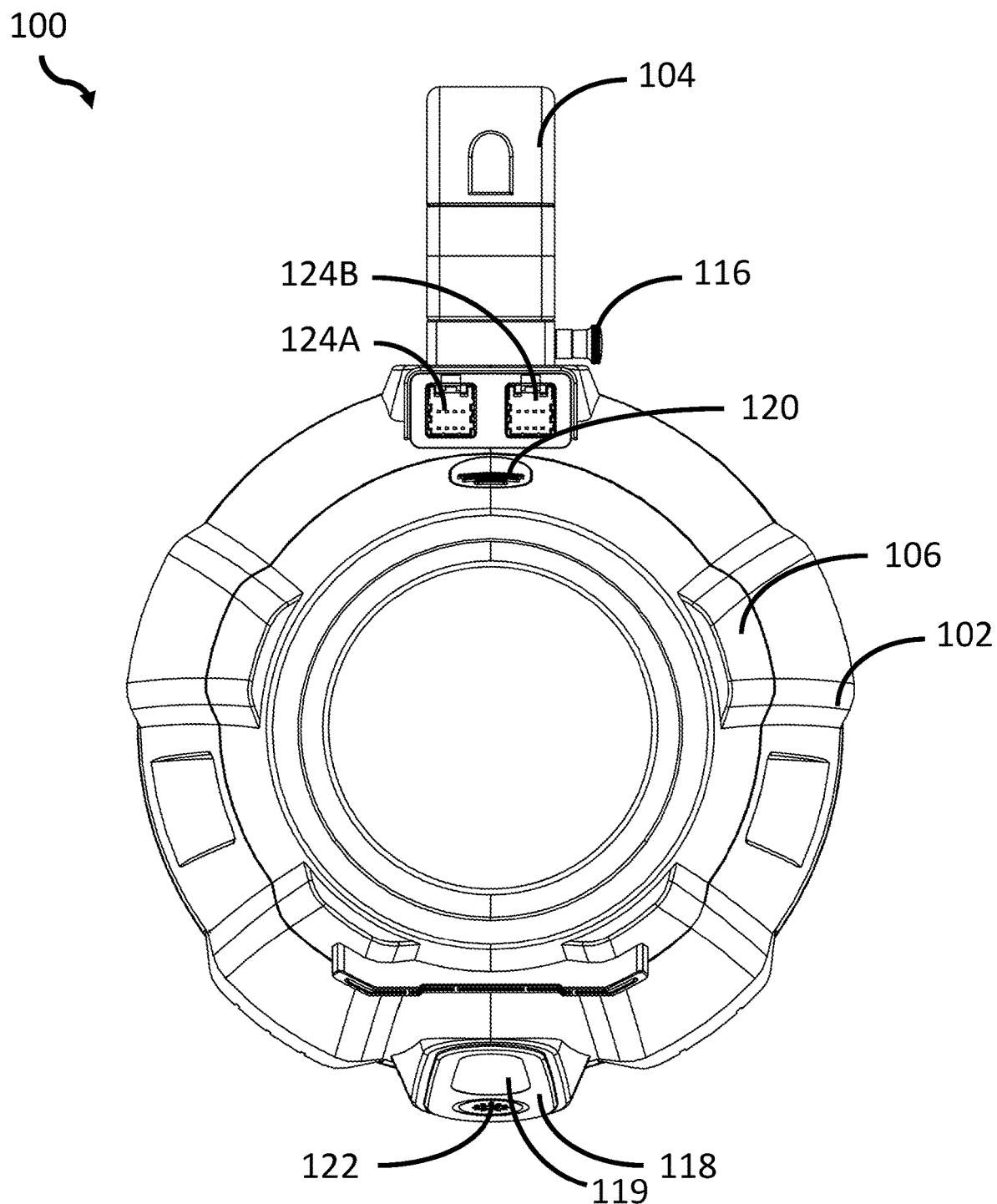
FIG. 6 shows a rear view of the illustrative cage tower speaker.

Referring now to FIG. 6 there is shown a rear view of the cage tower speaker 100 with the rear cover 106 secured in place by a latching mechanism coupled to the depressor button 120. This view displays the conical shape of the illustrative rear cover 106, as well as the semi-conical shape of the outer housing 102 (demonstrated by the angled view of the control panel 118 and indicator light 122). This view further displays the mounting bracket 104 secured in a lengthwise orientation by the set screw 116. This view also displays one or more electrical ports 124A and 124B. In some embodiments, one or more of the electrical ports 124A and 124B communicatively couple the tower cage speaker 100 to a dummy speaker through an audio cable or auxiliary cable. In some embodiments, one or more of the electrical ports 124A and 124B communicatively couple the tower cage speaker 100 to an illustrative user's mobile device such as a smartphone. In some embodiments, one or more of the electrical ports 124A and 124B electrically couple the tower cage speaker 100 to the dummy speaker, which provides power to the dummy speaker from the cage tower speaker 100 through a power cable. In some embodiments, one or more of the electrical ports 124A and 124B electrically couple the tower cage speaker 100 to a vehicle through a power cable, which provides power to the cage tower speaker 100 and/or one or more dummy speaker. In the illustrative embodiment, the one or more of the electrical ports 124A and 124B are each 8-pin connector ports.

In some embodiments, the cage tower speaker 100 further includes a power management module associated with control panel 118 that controls recharging operations. The control panel 118 may include one or more buttons 119 on the surface of the control panel 118. In some embodiments, the power management module recharges the removable rechargeable battery 128 when the cage tower speaker 100 is connected to external power, such as an outdoor vehicle or watercraft. In some embodiments, the power management module recharges the removable rechargeable battery 128 only when the cage tower speaker 100 is connected to a running engine of an outdoor vehicle or watercraft, in order to limit or prevent the possibility of drawing down all of the power in the outdoor vehicle or watercraft's battery, thereby killing the battery and stranding the operator. Thus, in some embodiments, the power management module only charges the removable rechargeable battery 128 when a vehicle's engine is in operation.

The electrical ports 124A and 1248 may operate as audio input and/or audio output for the reception and transmission of audio signals. In one embodiment, electrical port 124A may operate as an audio input, while electrical port 1248 may operate as an audio output. In this embodiment, the electrical port 124A receives audio signals from an external source, such as a vehicle to which the cage tower speaker 100 is mounted, a portable device (i.e., an Apple iPod, MP3 player, smartphone, or similar music playing device), and transmits those audio signals to the control panel 118, processor, memory, and any combination thereof. Also, in this embodiment, the electrical port 1248 transmits audio signals from the control panel 118, processor, memory, and any combination thereof to an audio system of a vehicle to which the cage tower speaker 100 is attached, or a portable device as described above.

Figure 7A:
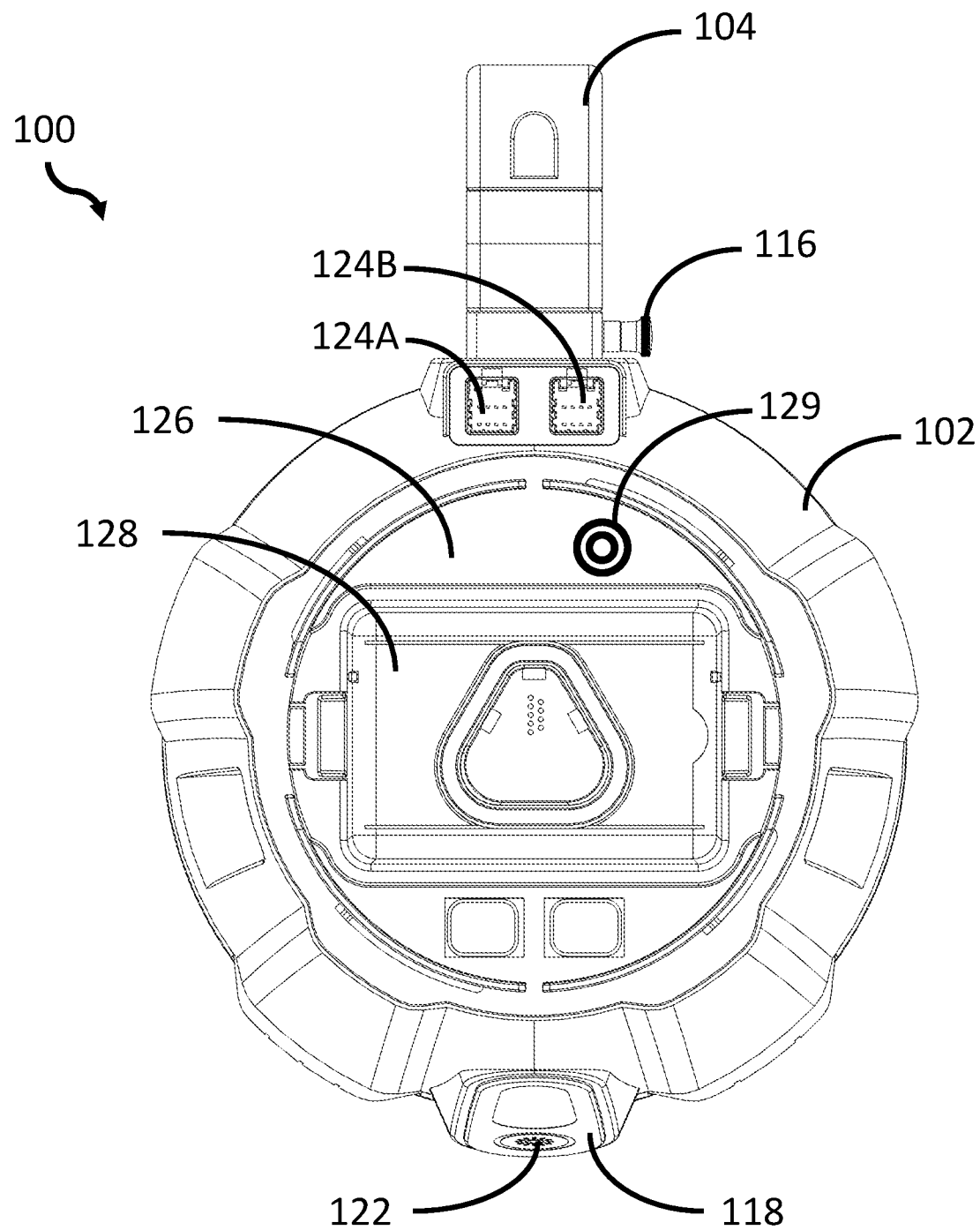
FIGS. 7A shows a view of the uncovered backside of the illustrative cage tower speaker.

Referring now to FIG. 7A, there is shown a rear view of the cage tower speaker 100 with the rear cover removed. This view also shows the mounting bracket 104 secured in a lengthwise orientation by the set screw 116, the conical taper of the outer housing 102, and the electrical ports 124A and 1248. With the rear cover removed, the rear cavity 126 is displayed. Within the rear cavity 126 is a removable and rechargeable battery 128 that mounts into a battery receiver with anode and cathode contacts that deliver power to and from the removable and rechargeable battery 128.

In some embodiments, the rear cavity 126 includes one or more one-way waterproof valves 129. The rear cavity 126 housing the battery 128 forms a rear wall of an interior cavity space housing the speaker driver 108 that separates the interior cavity space from the rear cavity 126. In the illustrative embodiment, a one-way waterproof valve 129 is located on the rear wall of the rear cavity 126, which controls the pressure differential between the interior cavity space and the rear cavity 126. The one-way waterproof valve 129 allows high pressure air to escape the interior cavity space (or isolated sound space) and prevents water, dirt, or mud from entering into the interior cavity.

In some embodiments, the one-way waterproof valve 129 is a membrane barrier operatively, fixedly, or otherwise coupled to the rear wall of the rear cavity 126, such that the membrane barrier covers the opening of a port of hole extending through the rear wall from the rear cavity 126 into the interior cavity space. The membrane barriers 129 may be a waterproof mesh material that allows air to pass through. One exemplary membrane barrier material is expanded polytetrafluoroethylene (ePTFE), especially as prepared by W.L. Gore & Associates, Inc. (i.e., Gore-Tex™). The ePTFE membrane material is a three-dimensional expansion of the linear base polymer PTFE that has a porous structure. In these embodiments where the membrane material is ePTFE, the membrane material may comprise multiple layers having unique compositions, wherein some layers may be the same composition as other layers and different compositions than still other layers. In these embodiments, the membrane barrier may operate by preventing liquid water from passing through while allowing nebulized or evaporate water particles through with air.

In some embodiments, the waterproof valves 129 may be mechanical one-way valves. In some embodiments, the waterproof valves 129 comprise a flap of waterproof material, one portion of which is affixed to a surface (i.e., a wall of the interior cavity and/or a wall of the rear cavity 126), while the remaining portions of the flap are unattached. By only partially affixing the flap of waterproof material to the surface surrounding a port through the surface, the flap may allow water through from the other side of the port, but slam closed when pressure is applied from the side of the surface to which the flap is attached. For example, a flap affixed to the interior surface of the interior sound space so that the flap covers a port from the interior sound space to the rear cavity 126 housing the battery, would swing open due to a pressure exerted from the rear cavity 126 and swing closed due to a pressure exerted from within the interior sound space.

One purpose of the membrane barriers 129 is to prevent a pressure differential from building up between the interior cavity (not shown) and the rear cavity 126 due to heat generated by the operation of the speaker driver assembly 108 and the extreme environments in which the cage tower speaker 100 operates, i.e., high air temperature and direct sunlight, or freezing temperatures. By allowing air to pass through the membrane barrier(s) 129, the membrane barrier(s) 129 act to conduct heat into or out of the interior cavity. Back pressure generated by the speaker driver assembly 108 may also escape through the membrane barrier(s)

129. A further purpose of the membrane barriers 129 is to allow pressure equalization between the rear cavity 126 and the interior sound space, without allowing any water to enter the rear cavity 126. Thus, the membrane barriers 129 may protect the rechargeable removable battery 128 from water and/or moisture.

The membrane barrier(s) 129 also prevent pressure from accumulating within the isolated sound space (i.e., acoustic-suspension box) that is the interior cavity for the speaker driver assembly 108, otherwise the pressure may accumulate until it is sufficient to dislodge the speaker driver assembly 108. Should the speaker be dislodged in this manner, it would decrease the sound quality produced by the cage tower speaker 100 by adding unintended vibrations from the dislodged speaker assembly 108. Further, water seeping through a dislodged element into the interior of the outer housing 102 may degrade or short-out internal electrical connections between the speaker 108 and either the control panel 118 or the battery 128. Further still, water seeping through a dislodged element into the interior of the outer housing 102 may enter the control panel 118 itself. Water seeping into the interior sound space may corrode and/or short any of the control panel connections or elements, such as the electrical ports 124A and 124B. Such water damage would shorten the operable life span of the cage tower speaker 100 or disable it entirely. However, the membrane barrier(s) 129 limit, prevent, and/or eliminate such degradation of the cage tower speaker 100 and extend its operable life span.

At the same time, although not necessarily so, the membrane barrier(s) 129 equalize the internal pressure present within the interior of the outer housing 102 (i.e., the interior sound space 130) with the pressure in the rear cavity 126, by allowing air to pass into or out of the interior of the outer housing 102 through the membrane barrier (not shown) without allowing water, dirt, or other debris to enter the outer housing 102 interior.

In some embodiments, when enclosed by the rear cover, the rear cavity 126 is a sealed, watertight compartment that protects the battery 128 and other interior electrical components of the cage tower speaker 100. The seal may be formed by a rubber O-ring or comparable sealing element seated about the exterior border of the rear cavity 126 and between the rear cavity 128 and the rear cover.

Figure 7B:
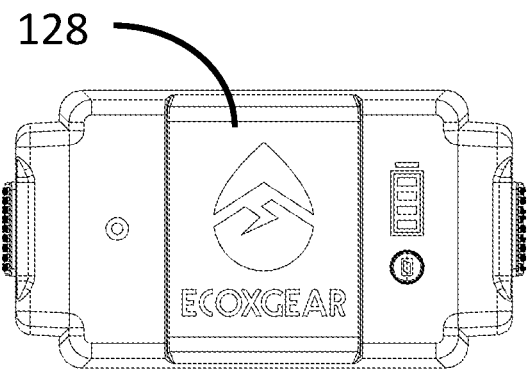
FIGS. 7B shows a view of an illustrative removable rechargeable battery.

With reference now to FIG. 7B there is shown the removable rechargeable battery 128 isolated from the rear cavity 126 of the cage tower speaker 100. In some embodiments, the removable rechargeable battery 128 is a Nickel-Cadmium (NiCd) battery. In some embodiments, the removable rechargeable battery 128 is a Nickel-Metal Hydride (NiMH) battery. In some embodiments, the removable rechargeable battery 128 is a Lithium Ion (Li-ion) battery. In some embodiments, the removable rechargeable battery 128 is surrounded by a durable casing that encloses the battery components. The durable casing may be rigid, waterproof, and/or impact resistant.

Figure 7C:
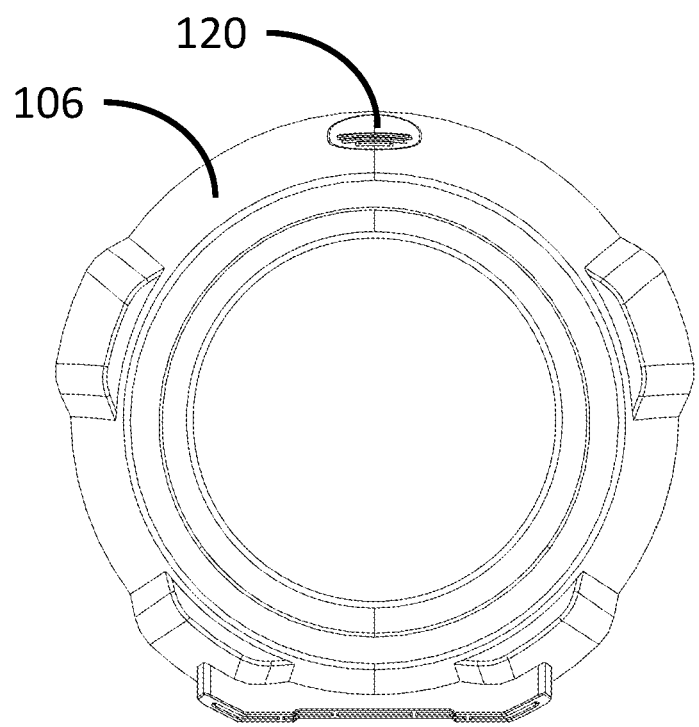
FIGS. 7C shows a view of the rear cover of the illustrative cage tower speaker in isolation.

Referring now to FIG. 7C there is shown the rear cover 106 removed from the outer housing and the depressor button 120 disengaged from any latch on the outer housing.

Figure 8:
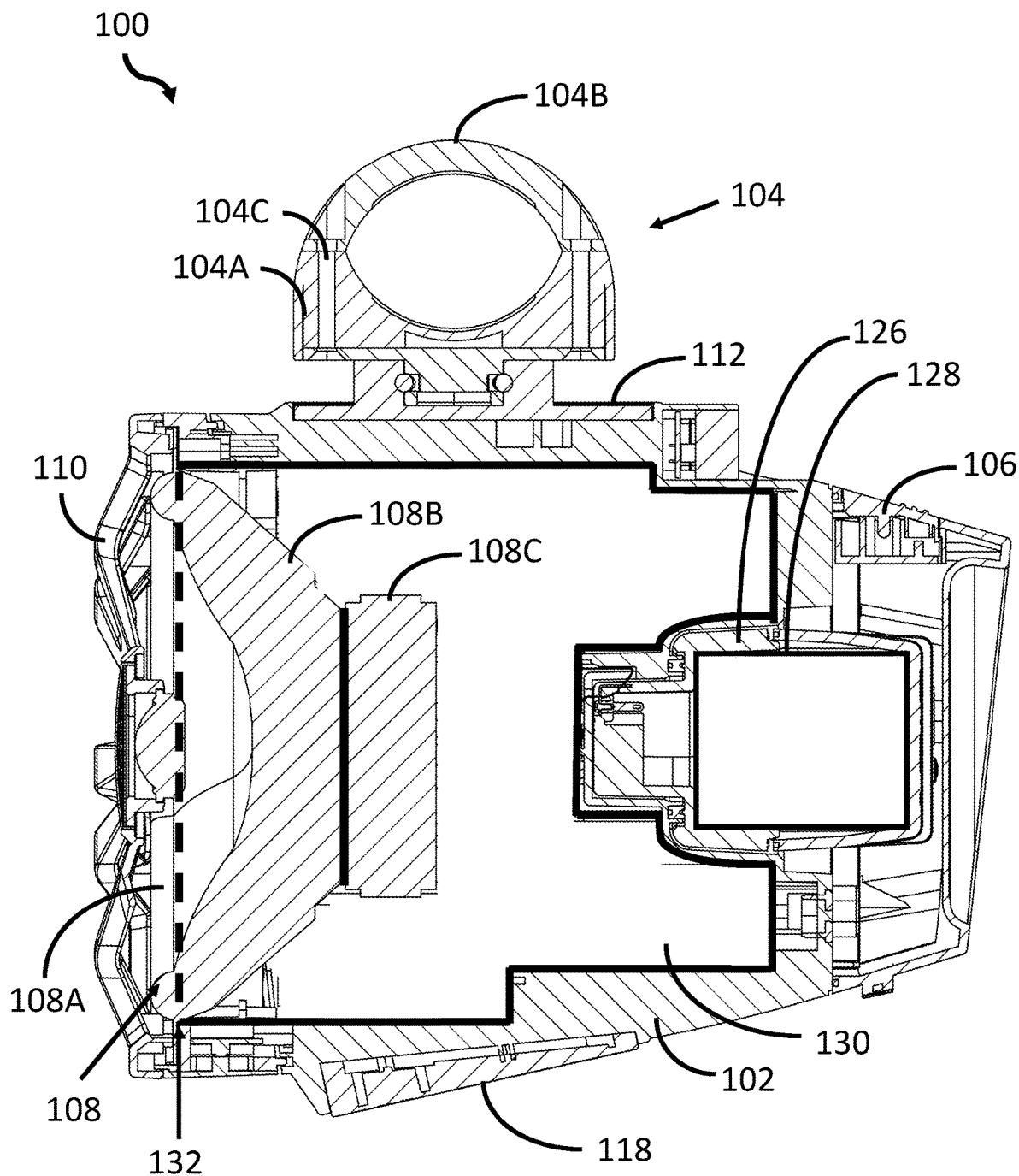
FIG. 8 shows a cutaway view of the interior of the illustrative cage tower speaker.

Referring now to FIG. 8 there is shown a cutaway view of the illustrative cage tower speaker 100. This cutaway view displays the two-piece structure of the illustrative ring mounting bracket 104. The illustrative two-piece ring mounting bracket 104 comprises a bracket base 104A and a bracket top piece 104B held together by one or more fasteners, screws, or threaded bolts inserted into a receiver hole 104C. In some embodiments, the two-piece ring mounting bracket 104 includes only a single receiver hole 104C on a front or back side of the two-piece ring mounting bracket 104 and a single pivot point on a side opposite the single receiver hole 104C. In this embodiment, the single pivot point allows the bracket top piece 104B to rotate open and rotate closed about the pivot point, while a fastener inserted into the receiver hole 104C when in the closed position secures the bracket top piece 104B in the closed position. The pivot point may include a pivot fastener that has a head or flange that is wider or larger than the width of the slot 104C.

The cutaway view of FIG. 8 shows the plate shape of the mounting inlay 112 attached to the surface of the outer housing 102. This view further shows the various components of the speaker driver assembly 108, such as the speaker driver cone 108A, the speaker chassis 108B, and the speaker base 108C. In some embodiments, the speaker base 108C comprises a front plate, a magnet, and a yoke. In some embodiments, the speaker driver cone 108A spans a frontal opening of the speaker chassis 108B and/or the frontal opening of the outer housing 102, while the speaker chassis 108B and the speaker base 108C sit within the interior cavity space 130 that is separated from the control panel 118 by the outer housing 102. The outer circumferential surface of the speaker driver 108 and the inner circumferential surface of the speaker grill 110 are sized and configured to interface with one another and the outer housing 102. Together, the speaker driver assembly 108 and the outer housing 102 form an isolated sound space into which sound waves and back pressure from the speaker driver assembly 108 are emitted. The rear cavity 126 housing the battery 128 forms a rear wall of the interior cavity space 130 that separates the interior cavity space 130 from the rear cavity 126. The frontal opening 132 is depicted with a dotted line in FIG. 8, while the interior cavity 130 is delineated by the bold black line and includes the rear wall.

The sound waves and/or back pressure generated by the speaker driver 108 are directed by the rear wall of the interior cavity space 130 outward back toward the frontal opening. In this manner, the interior cavity space 130 acts as an acoustic-suspension box or air-suspension box that cause back pressure or sound waves generated by speaker driver 108 to be directed outward along the lengthwise axis of the cage tower speaker 100 from the speaker driver 108 and the cage tower speaker 100.

In operation, the cage tower speaker 100 emits sound waves from the speaker driver assembly 108 according to input received from the control panel 118. The input may be the result of a user pressing one or more of the buttons on the control panel 118 or from a music file uploaded, input, or otherwise present upon a processor (not shown) of the cage tower speaker 100. In the illustrative embodiment, the speaker driver assembly 108 is located in the frontal circular opening of the outer housing 102 and emits sound waves outward from the frontal circular opening along a central lengthwise axis of the outer housing 102, while simultaneously emitting sound waves and/or back pressure into the interior sound space 130 also along the central lengthwise axis to rear wall of the interior cavity 130.

User commands input at or through the control panel 118 may also control the operation of the LED lights resident within the speaker 108. However, the operation of the various LED lights may be automated in conjunction with music played by the cage tower speaker 100 and require no specific input from a user.

It is to be understood that the detailed description of illustrative embodiments are provided for illustrative purposes. The scope of the claims is not limited to these specific embodiments or examples. Therefore, various process limitations, elements, details, and uses can differ from those just described, or be expanded on or implemented using technologies not yet commercially viable, and yet still be within the inventive concepts of the present disclosure. The scope of the invention is determined by the following claims and their legal equivalents.

What is claimed is:

1. A cage tower speaker system comprising:
   a first cage tower speaker including:
      a first outer housing including:
         a first frontal opening;
         a first rear opening;
         a first rear wall between the first frontal opening and the first rear opening, wherein the first outer housing, the first frontal opening, and the first rear wall form a first interior sound space surrounding a first speaker assembly;
         a first exterior surface extending from the first frontal opening to the first rear opening, wherein the first exterior surface surrounds the first interior sound space; and
         a first membrane coupled to the first interior sound space;
      a removable rechargeable battery; and
      a first mounting bracket coupled to the first outer housing.

2. The system of claim 1 further comprising a control panel communicatively coupled to the first speaker assembly.

3. The system of claim 2 wherein the control panel further comprises an FM radio.

4. The system of claim 2 wherein the control panel further comprises a Bluetooth radio.

5. The system of claim 1 wherein each of the first plurality of membranes comprise a waterproof mess material spanning a port extending from the first exterior surface of the first outer housing to the first interior sound space, wherein the waterproof mesh material allows the passage of air there through.

6. The system of claim 1 wherein the first speaker assembly comprises one of a first mid-range speaker, a first tweeter speaker, and a first woofer speaker.

7. The system of claim 1 wherein the first speaker assembly includes a first clear waterproof speaker driver cone and a light emitting diode (LED).

8. The system of claim 1 wherein the first cage tower speaker further comprises a rear cover that forms a seal around the first rear opening, wherein the first outer housing, the first rear wall, and the rear cover form a waterproof rear cavity that receives the removable rechargeable battery.

9. The system of claim 1 wherein the first cage tower speaker further comprises a first electrical port that receives a power cable coupling the first cage tower speaker to a vehicle power source, wherein the power cable provides power from the vehicle power source to recharge the removable rechargeable battery when a vehicle engine is in operation.

10. The system of claim 1 further comprising:
    a second cage tower speaker communicatively coupled to the first cage tower speaker, wherein the second cage tower speaker includes:
       a second outer housing including:
          a second frontal opening;
          a second rear wall, wherein the second outer housing, the second frontal opening, and the second rear wall form a second interior sound space surrounding a second speaker assembly;
          a second exterior surface extending from the second frontal opening to the second rear wall, wherein the second exterior surface surrounds the second interior sound space; and
          a second membrane coupled to the second interior sound space; and
       a second mounting bracket coupled to the second outer housing.

11. The system of claim 10 wherein the first cage tower speaker delivers audio input to the second cage tower speaker through an audio input cable.

12. The system of claim 10 wherein the first cage tower speaker delivers audio input to the second cage tower speaker through a Bluetooth communication channel.

13. A cage tower speaker system comprising:
    a first cage tower speaker including:
       a first outer housing including:
          a first frontal opening;
          a first rear wall between the first frontal opening and the first rear opening, wherein the first outer housing, the first frontal opening, and the first rear wall form a first interior sound space surrounding a first speaker assembly; and
          a first exterior surface extending from the first frontal opening to the first rear opening, wherein the first exterior surface surrounds the first interior sound space;
       a removable rechargeable battery;
       a first electrical port that receives a power cable coupling the first cage tower speaker to a vehicle power source, wherein the power cable provides power from the vehicle power source to recharge the removable rechargeable battery when a vehicle engine is in operation; and
       a first mounting bracket coupled to the first outer housing, wherein the first mounting bracket removably affixes the first cage tower speaker to a vehicle; and
    a second cage tower speaker communicatively coupled to the first cage tower speaker, wherein the second cage tower speaker includes:
       a second outer housing including:
          a second frontal opening;
          a second rear wall, wherein the second outer housing, the second frontal opening, and the second rear wall form a second interior sound space surrounding a second speaker assembly; and
          a second exterior surface extending from the second frontal opening to the second rear wall, wherein the second exterior surface surrounds the second interior sound space; and
       a second mounting bracket coupled to the second outer housing, wherein the second mounting bracket removably affixes the second cage tower speaker to the vehicle.

14. The system of claim 13 further comprising a control panel communicatively coupled to the first speaker assembly.

15. The system of claim 14 wherein the control panel further comprises an FM radio.

16. The system of claim 14 wherein the control panel further comprises a Bluetooth radio.

17. The system of claim 13 wherein the first cage tower speaker further comprises a rear cover that forms a seal around the first rear opening, wherein the first outer housing, the first rear wall, and the rear cover form a waterproof rear cavity that receives the removable rechargeable battery.

18. The system of claim 13 wherein the first cage tower speaker delivers audio input to the second cage tower speaker through an audio input cable.

19. The system of claim 13 wherein the first cage tower speaker delivers audio input to the second cage tower speaker through a Bluetooth communication channel.

* * * * *